Figure 1:
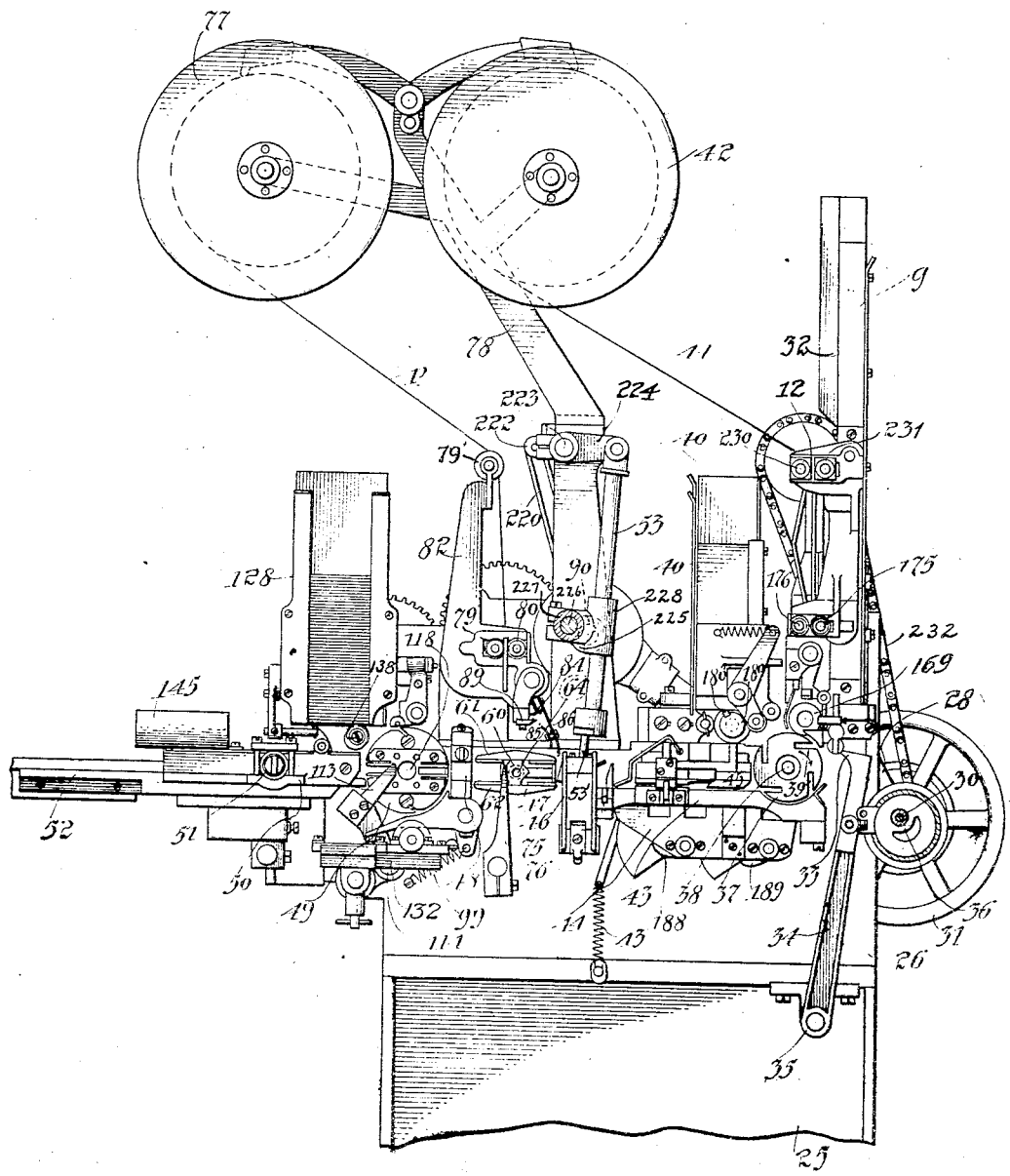

A. M. PRICE.
GUM WRAPPING MACHINE.
APPLICATION FILED AUG. 13, 1913.

1,109,461.

Patented Sept. 1, 1914.
10 SHEETS—SHEET 1.

Witnesses

Inventor
Albert M. Price

A. M. PRICE.
GUM WRAPPING MACHINE.
APPLICATION FILED AUG. 13, 1913.

1,109,461.

Patented Sept. 1, 1914.
10 SHEETS—SHEET 4.

Witnesses
Robert F. Weir
Arthur W. Carlson

Inventor
Albert M. Price
By Offield, Towle, Graves & Offield
Attys

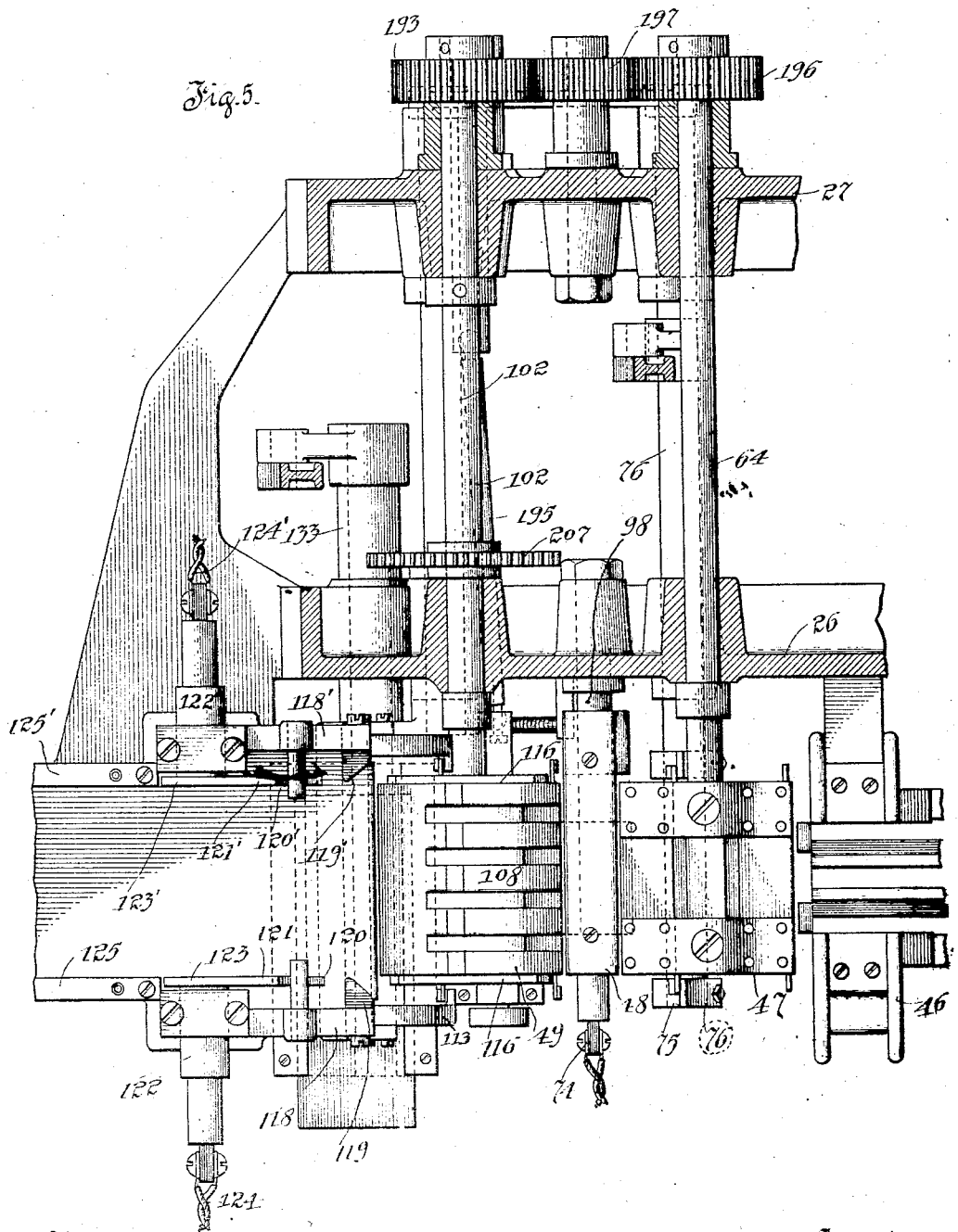

A. M. PRICE.
GUM WRAPPING MACHINE.
APPLICATION FILED AUG. 13, 1913.
1,109,461.  Patented Sept. 1, 1914.
10 SHEETS—SHEET 6.
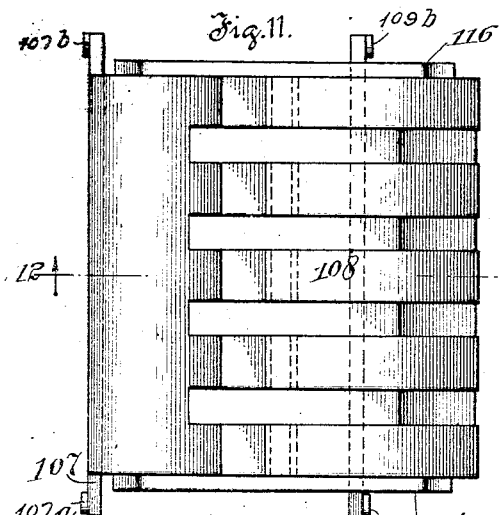
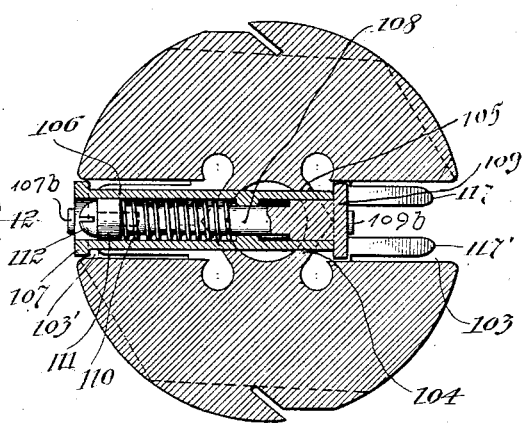
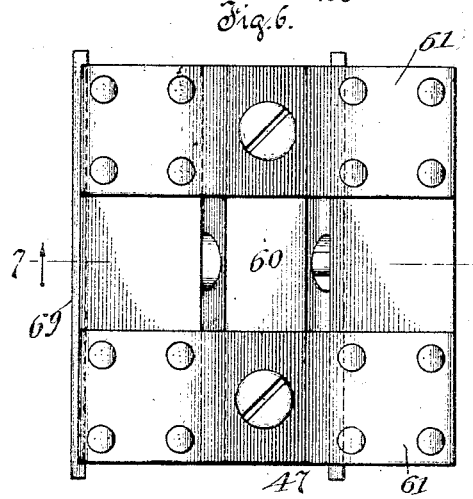
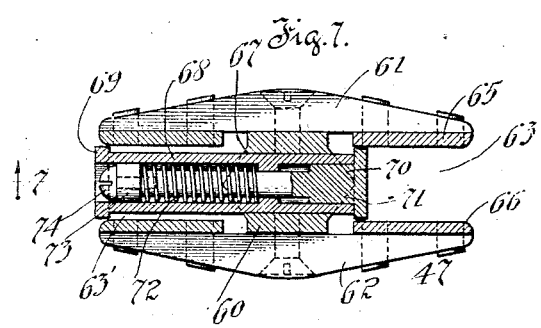
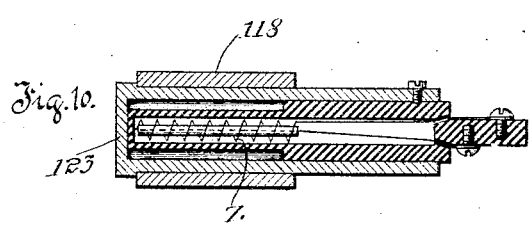

A. M. PRICE.
GUM WRAPPING MACHINE.
APPLICATION FILED AUG. 13, 1913.
1,109,461.
Patented Sept. 1, 1914.
10 SHEETS—SHEET 7.
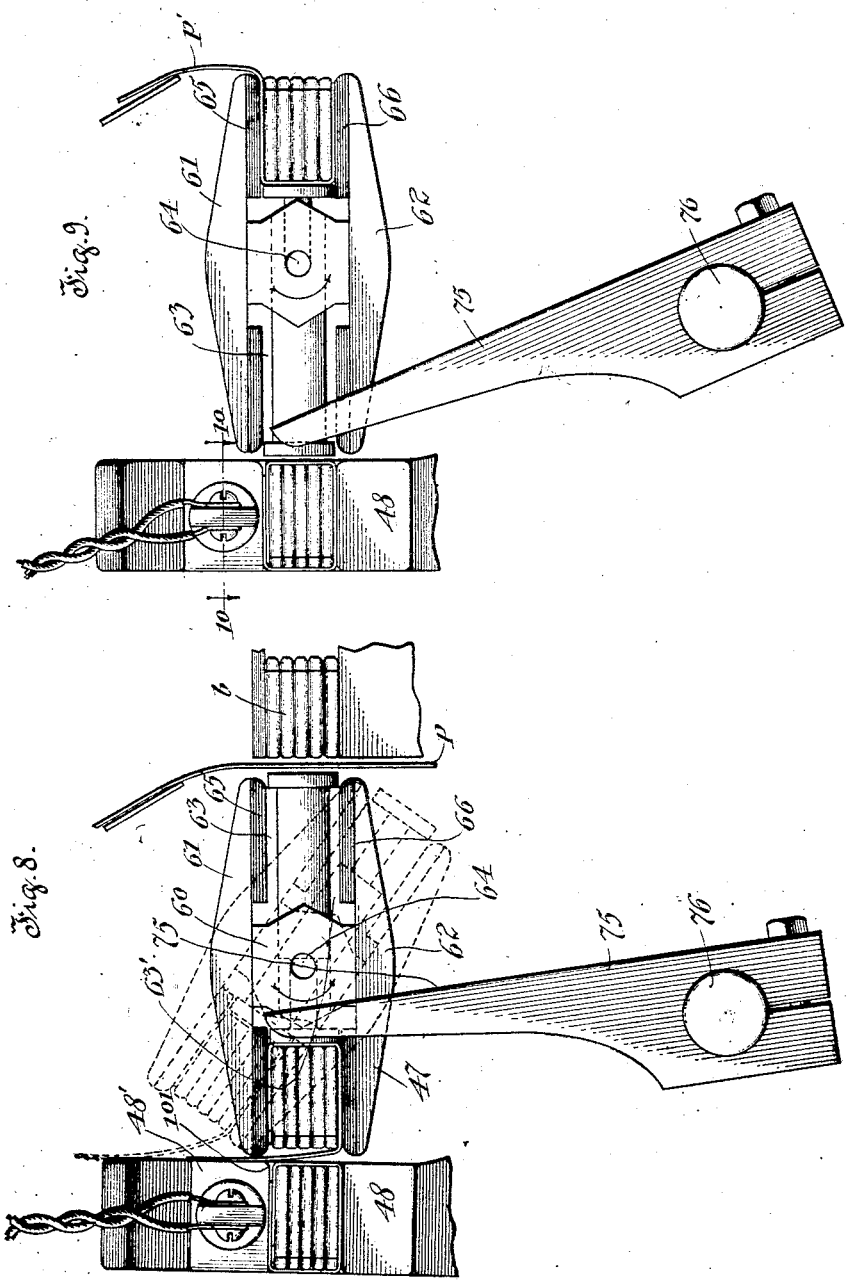

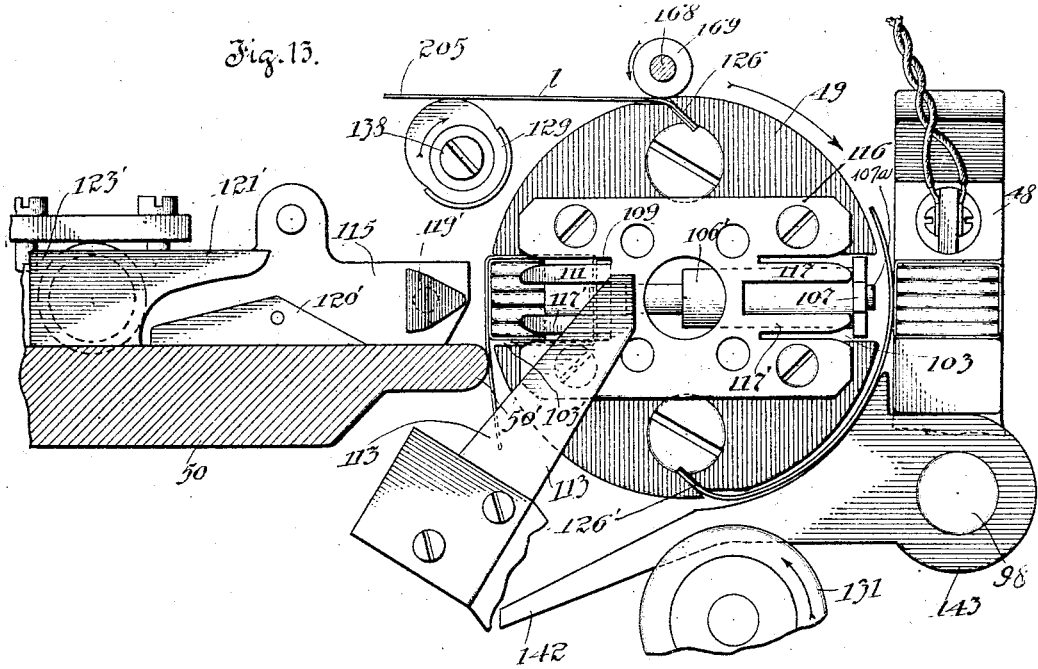
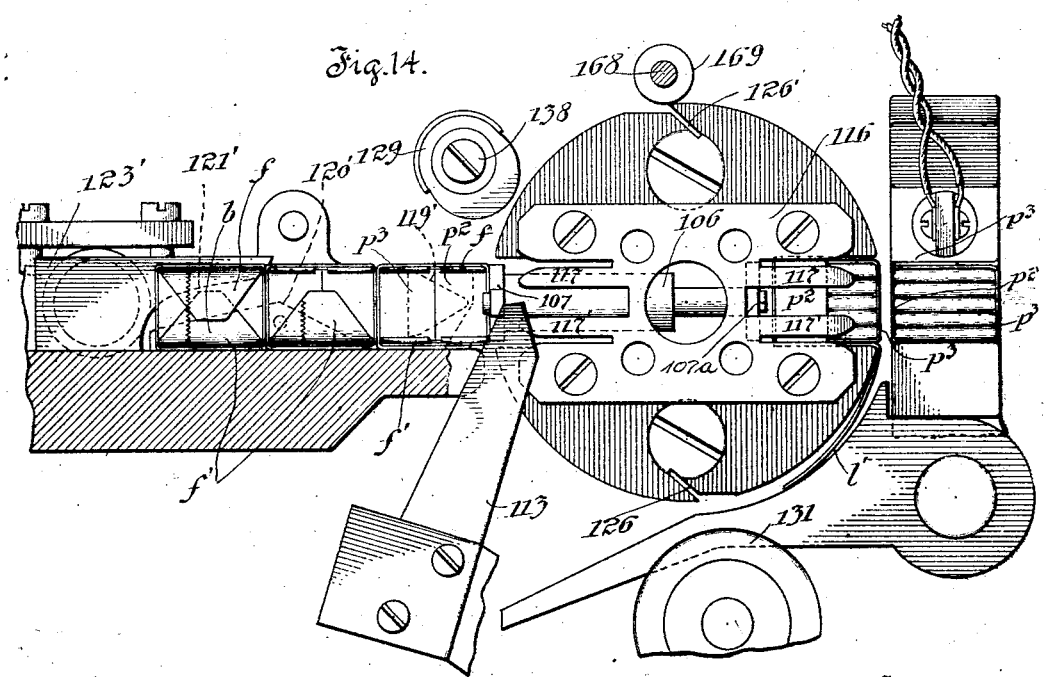

A. M. PRICE.
GUM WRAPPING MACHINE.
APPLICATION FILED AUG. 13, 1913.
1,109,461.
Patented Sept. 1, 1914.
10 SHEETS—SHEET 9.
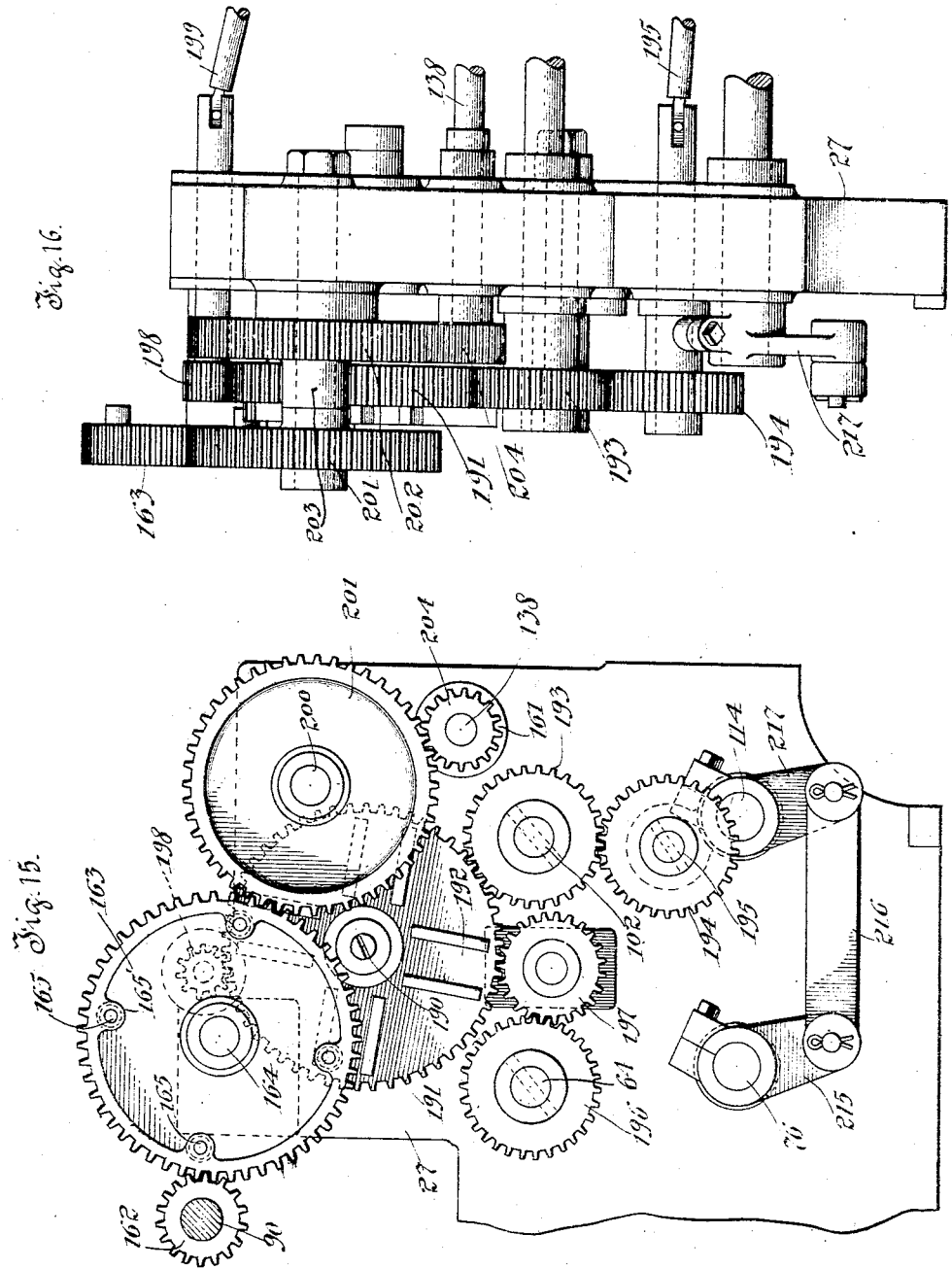

A. M. PRICE.
GUM WRAPPING MACHINE.
APPLICATION FILED AUG. 13, 1913.

1,109,461.

Patented Sept. 1, 1914.
10 SHEETS—SHEET 10.

Witnesses
Robert H. Weir
Arthur W. Carlson

Inventor
Albert M. Price
by Offield, Towle, Graves & Offield
attys.

UNITED STATES PATENT OFFICE.

ALBERT M. PRICE, OF ELGIN, ILLINOIS.

GUM-WRAPPING MACHINE.

1,109,461.  Specification of Letters Patent.  Patented Sept. 1, 1914.

Application filed August 13, 1913.  Serial No. 784,479.

*To all whom it may concern:*

Be it known that I, ALBERT M. PRICE, a citizen of the United States, and a resident of Elgin, in the county of Kane and State of Illinois, have invented certain new and useful Improvements in Gum-Wrapping Machines, of which the following is a specification.

My invention relates to wrapping machines, particularly to gum wrapping machines.

In my co-pending application Serial No. 759,657, filed April 8, 1913, I have shown and described an improved machine for wrapping chewing gum, the machine receiving the gum sticks at one end, the gum being successively transferred to operating fields, the sticks being first individually labeled and wrapped, the individually wrapped sticks being then arranged in bundles, and the bundles being then bound together each by a label band and being then ready for packing into suitable boxes.

The invention in this present application has for its chief object the provision of an additional step, namely the wrapping of each bundle in such manner that it will be entirely sealed against air and moisture. Such sealing is important as gum subjected to dry air will become hard and brittle and will break and crumble when chewed; and when gum is subjected to moisture it will absorb the moisture and it will become soft and sticky.

The invention also involves simple and efficient driving mechanisms for causing synchronous and properly timed operation of the various mechanisms.

The machine of this application like that of the co-pending application referred to, comprises means for wrapping the individual gum sticks, means for bundling the individually wrapped sticks, and means for binding the bundles together. In addition to such mechanisms the present machine has mechanism for individually wrapping the bundles in material such as wax paper together with mechanism for properly and accurately folding the ends of the wrappers, and mechanism for sealing the over-lapping and over-folded ends together.

As the individual stick wrapping mechanism, the bundling mechanism, and the band applying mechanism in this present machine are of substantially the same construction as the machine in the co-pending application, it will not be necessary to show and describe such mechanisms in detail. However, the additional mechanisms in the present machine are fully shown in the accompanying drawings and fully described in the following specification.

Figure 2:
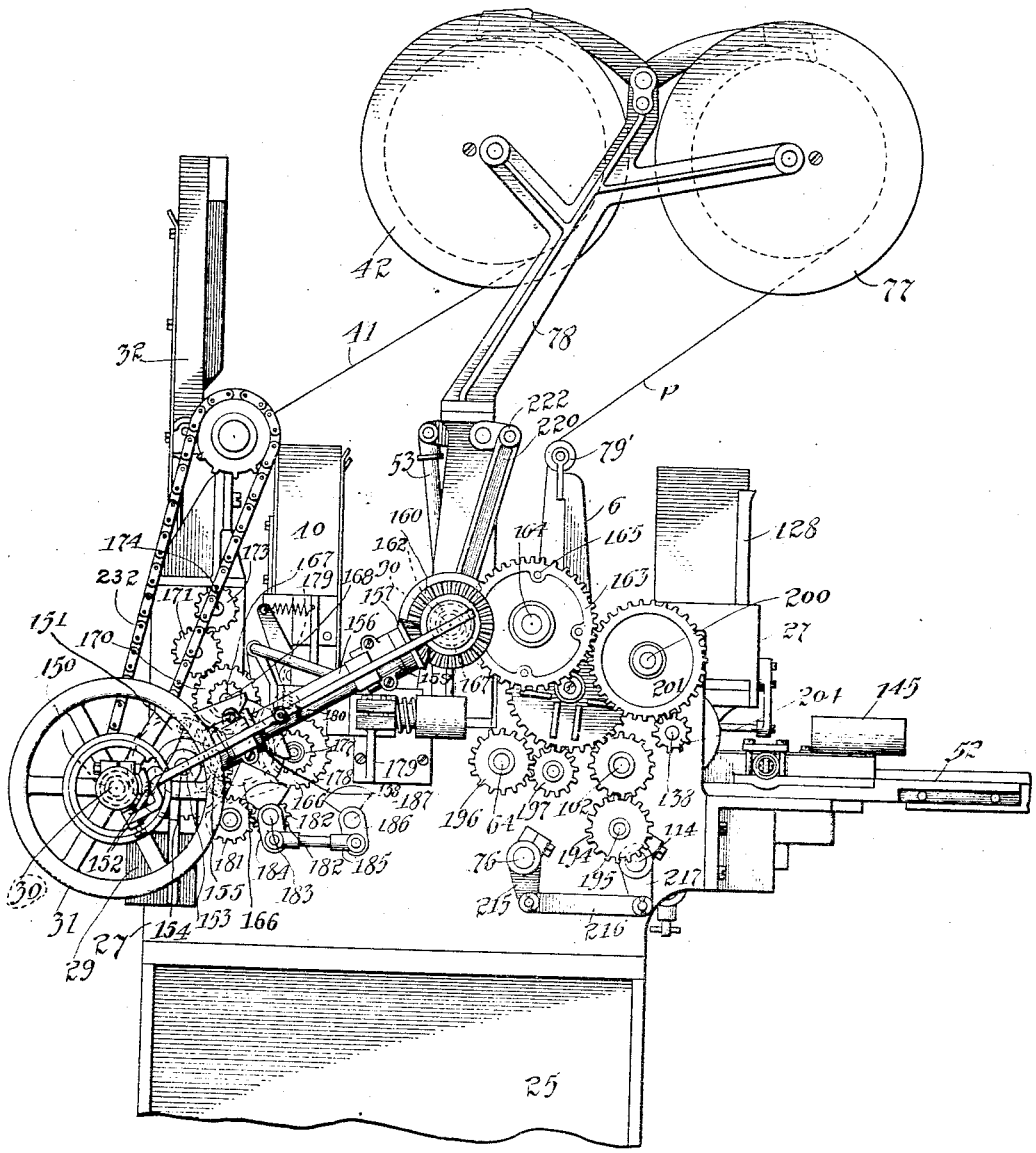
Figure 3:
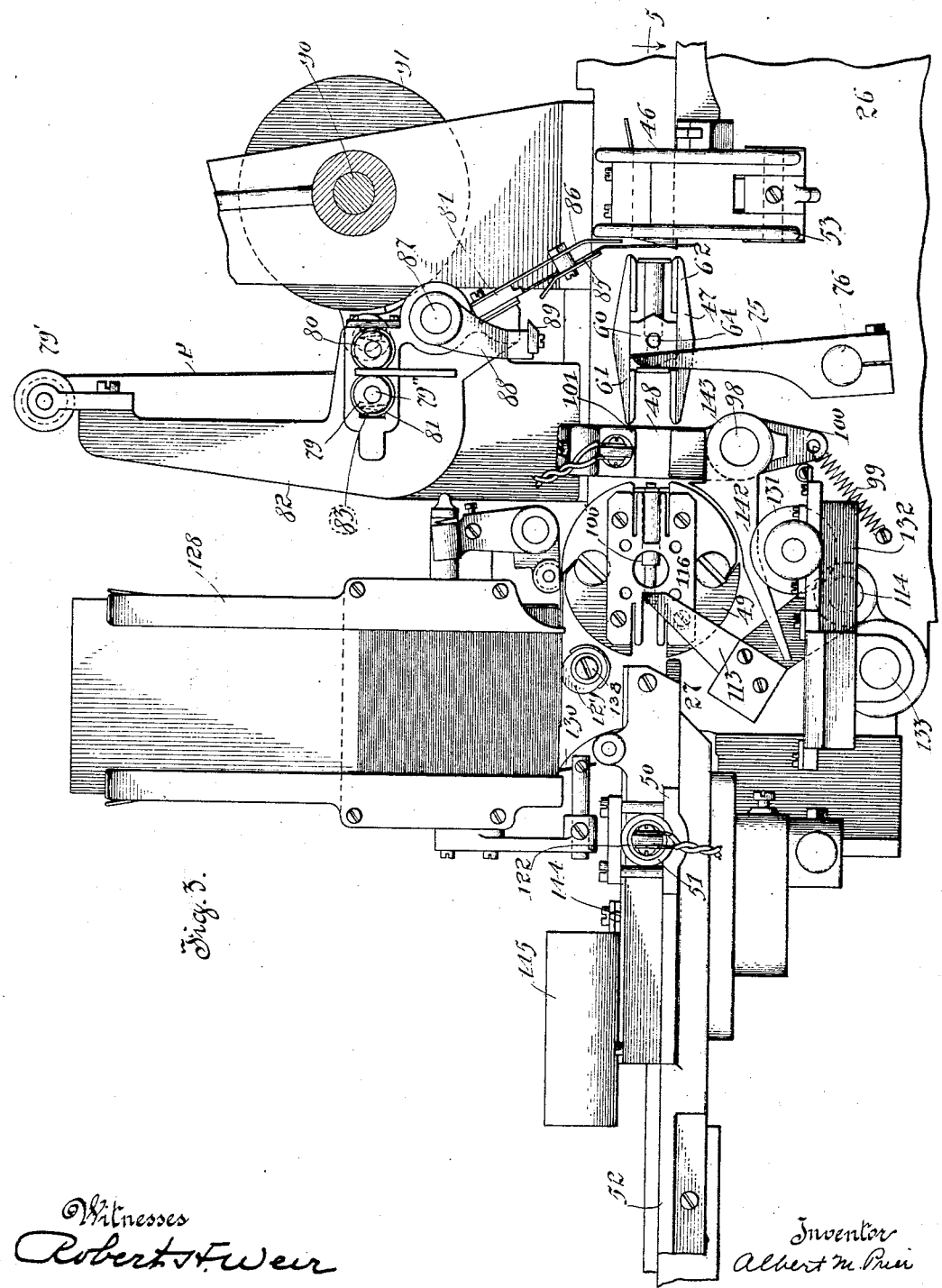
Figure 4:
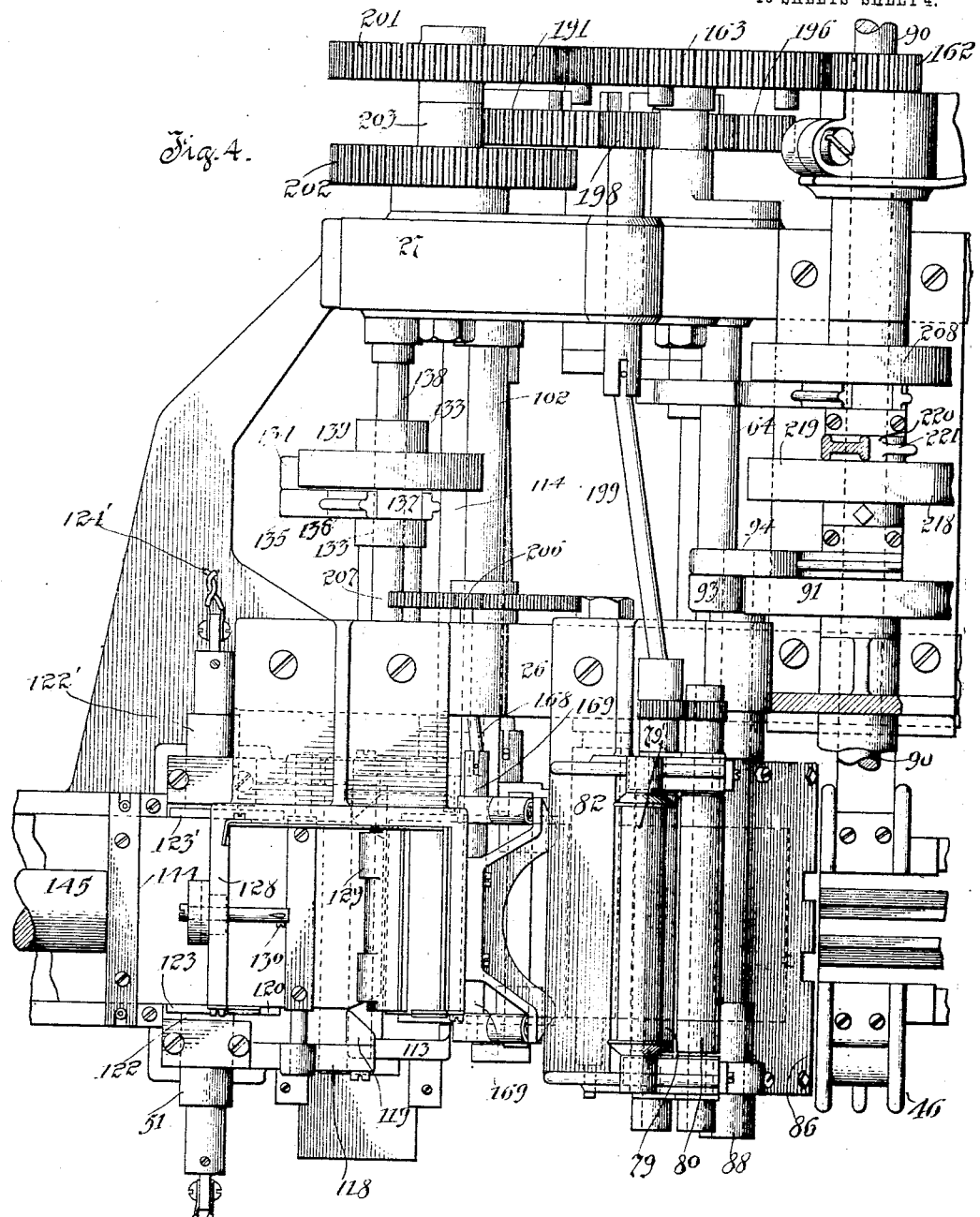
Figure 17:
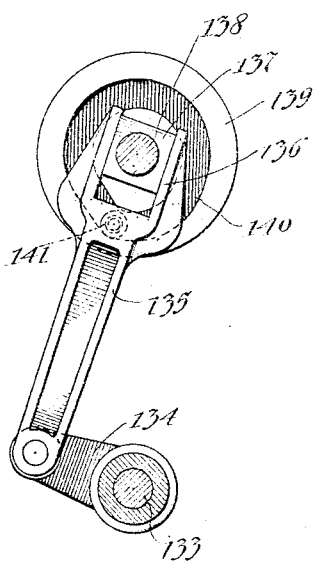
Figure 19:
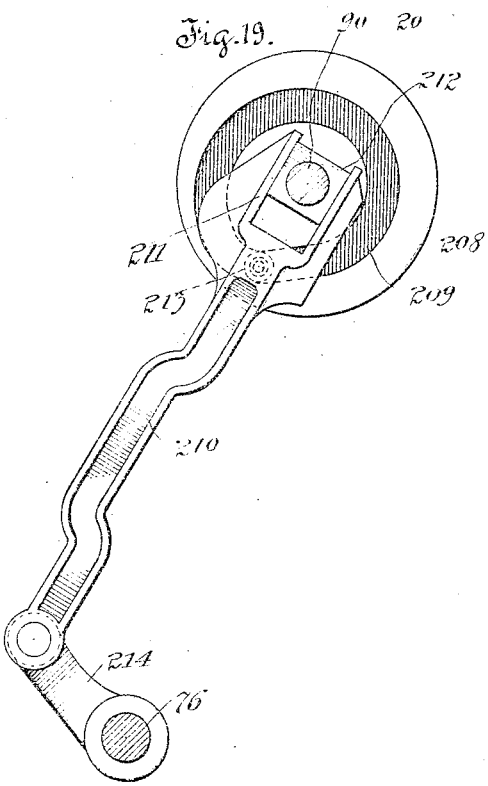
Figure 18:
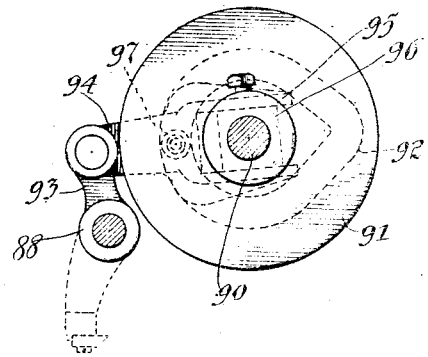
Figure 20:
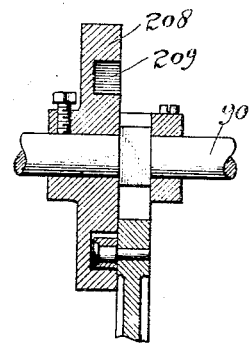

In these drawings Figure 1 is a front elevational view of the machine, Fig. 2 is a rear elevational view, Fig. 3 is an enlarged front elevational view of the left half of the machine to show particularly the mechanism for applying the sealing wrappers to the bundles, Fig. 4 is a plan view of the parts shown in Fig. 3, Fig. 5 is a plan view looking substantially from plane 5—5, Fig. 3, Fig. 6 is an enlarged plan view of the bundle transferring member, Fig. 7 is a sectional view on plane 7—7, Fig. 6, Fig. 8 is a front elevational view of the bundle transferring mechanism and heating mechanism for softening the wax, the position of the parts showing a bundle about to be shifted from the transfer member into the heating mechanism, Fig. 9 is a front elevational view of the same parts shown in Fig. 8 but in position in which a bundle has been expelled into the heating mechanism from one end of the transferring mechanism and a bundle received in the opposite end thereof, Fig. 10 is a sectional view of the heating mechanism taken on plane 10—10, Fig. 9, Fig. 11 is a plan view of a rotary folding and label applying drum, Fig. 12 is a sectional view on plane 12—12, Fig. 11, Fig. 13 is a front elevational view of the rotary drum and ejector mechanism for transferring partially folded bundles to the delivery table provided with mechanism for completing the folding operation and with heating mechanism for softening the wax of the over-lapping folds, Fig. 14 is a similar view showing parts in position just after the bundle has been transferred to the delivery table, Fig. 15 is an enlarged elevational view of driving gears situated at the rear of the machine, Fig. 16 is a view of the gears of Fig. 15 looking from the right, Fig. 17 is an enlarged view of certain cam mechanism for controlling the operation of gluing mechanism, Fig. 18 is an enlarged view of certain knife and operating cam mechanism therefor, Fig. 19 is an enlarged view of certain cam mechanism for controlling arms for discharging bundles from the rotary drum, and Fig. 20 is a sectional view on plane 20—20— Fig. 19.

A suitable base or standard 25 supports front and rear frames 26 and 27. At the right hand side of the machine these frames support bearing brackets 28 and 29 journaling the main drive shaft 30, this drive shaft carrying at its rear end the drive pulley 31. At the right side of the machine is the vertically disposed magazine 32 for the chewing gum sticks $g$, mechanism associated with this magazine and fully described in the co-pending application referred to serving to deliver the gum sticks successively into the path of the upper end 33 of the feed lever 34 pivoted at its lower end to the machine frame as indicated at 35, the lever being swung by means of a connecting rod having eccentric connection with the main drive shaft 30 as indicated at 36. The drum 37 carried on shaft 38 has the longitudinal pockets or grooves 39 spaced 90 degrees apart, this drum being rotated in the direction of the arrow indicated thereon to successively bring the grooves into position to receive the lowermost gum stick from the magazine 32, the drum being advanced intermittently and pausing a sufficient length of time while a gum stick is charged into the groove by the lever 34.

As fully described in the co-pending application referred to, individual wrappers are fed from the magazine 40 and pieces of oiled paper are cut from paper 41 fed from a roll 42, each oiled piece being superposed on a wrapper and delivered to the drum 37 in front of the groove therein which is about to receive a stick of gum, the wrapper together with the oiled paper being folded at one end into the groove with the gum stick. This drum coöperates with the table 43 to further fold the papers and wrappers about the gum sticks, the sticks being then transferred by the transfer member 44 from the drum grooves into the passageway between the table 43 and the block 45 above the table, the wrapping being then completed with the exception of folding of the ends. As fully described in the co-pending application referred to, the sticks with the individual wrappings about them are progressively shifted through the passageway between the table and the block, and during such passage the ends of the wrappers are folded over and against one side of the sticks, the wrapped sticks being then stacked into bundles of five sticks each at the end of the table and delivered into and through the frame 46 front which frame the bundles are delivered into the rotary transfer member 47, and from this transfer member the bundles are passed successively through the heating mechanism 48, the rotary drum 49, the folding frame 50, heating mechanism 51, and the discharge shelf 52. Upon passage of the bundles through the members 49 and 50 label bands are applied thereto in exactly the same manner as in the machine of the co-pending application. The present machine differs particularly from the earlier machine in the provision of the rotary transfer member 47, heating members 48 and 51, and additions on the rotary drum 49 and frame 50, these members and additions coöperating to apply a sealing wrapper to each bundle before application thereto of a label band. Up to the rotary member 47, the operation of the machine is substantially identical with the machine of the co-pending application, the bundles being shifted from the frame 46 into the rotary member 47 by the fork lever 53 fully shown and described in said co-pending application.

In Figs. 6 to 10, the construction of the members 47 and 48 and their coöperation to wind sealing papers about the bundles is shown in detail. The member 47 comprises a hub 60 to whose opposite sides are secured the flat frames 61 and 62 to form the pockets 63 and 63'. The hub is secured to the front end of a shaft 64. Wearing plates 65 and 66 are provided in the pockets 63 and 63' respectively and secured to the frames 61 and 62, the distance between these plates being substantially the same as the height of five individually wrapped gum sticks. Extending transversely through the hub 60 and midway between the ends of the frames 61 and 62 is the passageway 67 into which extends the inner end of the sleeve 68 carrying at its front end the discharge plate 69. Telescoping into the sleeve 68 is a stem 70 carrying at its outer end a discharge plate 71, a spring 72 encircling the stem between the base of the sleeve and the collar 73 secured to the stem by the screw 74. The sleeve and piston together with the discharge plates form a discharging frame for discharging gum bundles from the pockets 63 and 63' to the heating mechanism 48. The ends of the discharge plates 69 and 71 extend a distance beyond the ends of the frames 60 and 62 to be engaged by the end of a discharge arm 75 secured to a shaft 76. This arm is moved intermittently to engage with its end against the projecting ends of the discharge plates to shift the discharge frame toward the heating member as clearly shown in Fig. 9. The members 47 and 48 coöperate to complete the winding about each bundle of a sealing wrapper which is partly wound about the bundle upon insertion of the bundle into the right side of the member 47 by the fork member 53. The mechanism for feeding wrapping paper pieces to the bundles is clearly shown in Figs. 1, 3 and 5. The wrapping material is preferably paraffined or waxed paper $p$ and is fed from a roll carried on a spool 77 which is journaled on standards 78 which also supports a spool 42 carrying the oiled paper for the individual stick wrapping. From the roll the paper p passes downwardly over roll 79' between guide rolls 79 and 80 journaled at the opposite ends in pockets 81 provided in frame 82, springs 83 tending to press the rolls together. From the rolls the paper passes adjacent a knife bar 84 supported from the lower end of frame 82, and then passes between the guide plates 85 and 86 into position between the guide frame 46 and the member 47. Extending from shaft 87 is a knife frame 88 carrying at its lower end the knife blade 89 whose edge coöperates, upon swinging of the frame, with the cutting edge of the bar 84 to cut the paraffin paper band. As best shown in Fig. 18, the shaft 90 carries a cam disk 91 having the cam groove 92. Pivoted to the end of arm 93 extending from the cutting frame 88 is a cam lever 94 whose fork end 95 embraces a nut 96 on shaft 90. Pivoted to the cam lever 94 is a cam roller 97 which engages in the cam groove 92. Upon rotation of the shaft 90 the cam mechanism causes operation of the knife mechanism to cut the paraffin paper into length suitable for the wrapping of bundles.

Figs. 8 and 9 show the manner in which the bundles are wrapped upon passage from the guide frame 46 to the heater frame 48. The end of the paper p is fed down as illustrated in Fig. 8, between the bundle in the frame 46 and the pocket 63 of the rotary transfer member 47. As the bundle b is now moved out of the frame 46 by the fork arm 53 it will carry with it into the pocket 63 the end of the paper p. which end will have been cut from the paper band before engagement thereof by the bundle. The operation of the shaft 76 is so timed that the arm 75 will engage with the left hand plate to shift the discharge frame toward the left to clear the pocket 63 for the reception of the gum bundle and the parts will then be in relative position as indicated in Fig. 9, the lower end of the paper being wrapped about the bottom inner side and top of the bundle. As will be shown later, the driving mechanisms are such that the member 47 will be at rest during charging therein of a gum bundle whereupon it will be rotated 180 degrees in counter clockwise direction to carry the received and partly wrapped bundle into position in front of the heating frame 48. During such rotation the upper end p' of the paper will fall against the outer face of the gum bundle and will be disposed between such face and the entrance of the heating frame when the transfer member 47 again comes to rest. During such period of rest of the transfer member the arm 75 again becomes active to shift the discharge frame within the transfer member and the gum bundle is discharged into the heating frame, and at the same time another bundle is charged by the fork lever 53 into the opposite pocket of the transfer member. Upon passage of the bundle into the heating member the outer end of the wrapping paper is folded against the inner end by the block 48' of the heating member. This block is heated in any suitable manner as by means of a resistance coil at the interior thereof, the heat softening the wax and causing flux thereof between the over-lapping paper ends so that when the wrapped bundle is discharged from the heating member the wax will cool and the paper ends will be securely sealed. It will be noted that the heating frame 48 is pivoted on a stud 98 extending from side frame 26 and is held inclined a trifle from the vertical and away from the transfer member 49, a spring 99 connecting between the machine and an arm 100 extending downwardly from the heating frame. It will also be noted that the entrance edge 101 of the block 48' is well rounded. After the bundle reaches the heating member 48 the wrapping paper ends overlapping the top of the bundle are sealed together but the sides of the paper extending beyond the bundle ends are still to be folded together and sealed. Such folding and sealing of the paper ends is accomplished during carriage of the bundles into the rotary drum 49 and through the frame 50, coincident with the application of label bands to the bundles.

The construction and operation of the drum 49 is clearly illustrated in Figs. 1 and 3 and 11 to 14. The drum is secured to the end of a shaft 102 and has opposite longitudinal pockets 103 and 103' extending radially from the hub 104. Extending diametrically through the hub substantially midway of the pockets is the passageway 105 in which reciprocates a sleeve 106 carrying at its outer end a discharge plate 107. Extending into the sleeve through the base thereof is a stem 108 carrying at its outer end a discharge plate 109, a spring 110 encircling the stem between the sleeve base and the collar 111 held to the stem by the screw 112. The sleeve, stem and plates constitute the discharge frame, reciprocable diametrically in the drum in substantially the same manner as the discharge frame in the transfer member 47. The ends of the discharge plates extend a distance beyond the drum ends to be engaged by the ends of ejector arms 113 adjacent the drum ends and carried by shaft 114. The drum is intermittently rotated 180 degrees to carry its opposite pockets successively into register with the passageway of the heater mechanism 48, and a folding passageway 115 above the frame or table 50, to receive partially wrapped gum bundles from the heater mechanism and to discharge such bundles into passageway 105, the bundles during such travel having the side sections of the sealing wrapper folded and sealed together, and having a label band applied thereto. Describing first the folding mechanism and operation, plates 116 and 116' are secured to the opposite ends of the drum and are cut away at the ends to register with the pockets 103 and 103' but to leave upper and lower folding tongues 117 and 117' at the opposite ends of the pockets. In Fig. 13 the drum is shown in position about to discharge a gum bundle into passageway 105 and to receive another gum bundle in its opposite pocket. The sequence of operations is such that the fork member 53 will act slightly in advance of the discharge arms 113 in order that the wrapper extensions $p^2$ may be given a preliminary folding deflection before being finally folded into place by the tongues 117 and 117'. As clearly shown in Figs. 11 and 13, the ends of the discharge plates 107 and 109 have projections $107^a$ and $107^b$ and $109^a$ and $109^b$ respectively, the distance between these projections being a trifle greater than the length of the wrapped gum sticks. Referring now to Fig. 13, a bundle within the heating frame 48 will be shifted by the fork member 53 toward the transfer member 49 and the near side wrapper extensions $p^2$ will be engaged midway between their upper and lower sides and a distance away from the gum stick ends by the projections $107^a$ and $107^b$ and will be started accurately on their folding movement before the folding tongues 117 and 117' are reached. After such preliminary folding the arms 113 become effective to positively shift the discharge frame and the gum bundle is shifted by the fork member 53 entirely into the pocket 103 and the wrapper near side extensions $p^2$ are finally folded against the gum stick stack. When the drum is rotated 180 degrees the gum bundle will present its opposite side sections $p^3$ to the passageway 105. Plates 118 and 118' form the sides of this passageway and from the front ends of these plates folding lugs 119 and 119' of triangular cross section extend into the passageway and their entrance edges are tapered as clearly shown in Fig. 5. When the gum bundle is now ejected from the drum it enters passageway 115 and the wrapper side extensions $p^3$ are engaged by the folding lugs and these extensions folded against the folded extensions $p^2$, as shown in Fig. 14. To the left of the folding tongues 119 and 119' the side plates 118 and 118' support folding plates 120 and 120' of triangular shape, as clearly shown in Fig. 13. Above the left half of these plates are folding fingers 121 and 121'. After a gum bundle has passed the folding tongues 119 and 119' the wrapper ends will be in the form of upper and lower triangular flaps $f$ and $f'$ extending perpendicularly to the gum bundle ends. The plates 118 and 118' are sufficiently far apart to receive the bundles with the flaps thus extending outwardly. Now as the bundle passes along between the side plates the lower flaps $f'$ are first engaged by the folding plates 120 and 120' and are deflected upwardly and against the bundle ends. The upper flaps then pass below the folding fingers 121 and 121' and are deflected downwardly and against the bundle end to partly overlap the lower folded-in flaps, the wrapper sides being then entirely folded into place. Extending through the side plates 118 and 118' are heating blocks 122 and 122' whose inner ends terminate in the plates 123 and 123' from which extend the folding fingers 121 and 121' respectively. In the heating blocks are suitable heating coils Z connected respectively with electrical conductors 124 and 124'. As the wrapped gum bundles pass between the plates 123 and 123' and with their folded flaps in contact with said plates, the flaps are heated and the wax softened. Then when the bundles leave the heating field and pass farther along the table 50 and between the cooler side walls 125 and 125', the wax again hardens and the folded wrapper sides are securely sealed together, the gum being then sealed against the access of moisture and air.

Simultaneous with the above folding operation, label bands are applied about the bundles. Referring to Figs. 13 and 14 diametrically opposite slots 126 and 126' are cut into the drum parallel with its axis and into these slots the labels $l$ are fed from the magazine 128, the rubber surfaced feed disk 129 shifting the labels one by one toward the drum, the detent point 130 preventing the escape of more than one label at a time. When a label is received in the upper slot 126 the drum is at rest and when rotated 180 degrees this label is carried around the drum and trailed between the gum bundle within the heater mechanism 48 and one of the pockets in the drum. Now upon shifting of the gum bundle into the pocket the end of the label is carried into the pocket in advance of the bundle and wrapped about the bottom, the inner side and top thereof. When the upper end of the label is thus carried into the pocket with the gum bundle its lower end $l'$ is drawn out of the drum slot and carried upwardly as indicated in Fig. 14. During such upward movement glue is applied to the lower end by means of glue applying disks 131 revolvable in a glue receptacle 132 secured to shaft 133 at its left side. Extending from the shaft 133 is an arm 134 to which the lower arm of a cam rod 135 is pivoted, the bifurcated end 136 of this cam rod embracing a nut 137 on shaft 138, this shaft carrying a cam disk 139 having a cam groove 140 for receiving the cam roller 141 pivoted to the cam rod. With this arrangement shaft 133 is rocked to carry upwardly that end of the glue receptacle in which the glue applying disks are mounted. These disks pass upwardly between the fingers 142 extending from a frame 143 secured to the stud 98 on which the heating member 48 is pivoted, the upper surface of the fingers being concentric with the drum as clearly indicated in Fig. 3. As the end $l'$ of the label band is drawn upwardly between the drum surface and the glue applying disks, streaks of glue are applied thereto, this taking place while the drum is at rest. When the drum again rotates 180 degrees the end $l'$ is carried upwardly and falls over to hang against the outer side of the gum bundle and against the under edge $50'$ of the table 50. Now as the bundle is discharged into the passageway 115 the end $l'$ with the glue thereon is wrapped about the lower side of the bundle and to overlap the other end of the label, the ends being then securely glued together. The passageway 115 is closed on top by a cover 144 held down by a weight 145, the weighted cover exerting slight pressure on the bundles as they pass through the passageway 115. After emerging from this channel the wrapped bundles travel along the shelf 52 from which they are packed into suitable boxes.

In the preceding description of the heating frame 48 it was pointed out that this frame was pivoted and yieldingly held inclined a trifle from the vertical and away from the transfer member. This is for the purpose of allowing ample clearance space between the heating frame and the transfer member for the feeding of the labels. The upper entrance edge 101 being well rounded the gum bundles can readily enter from the transfer member 47, and during discharge of the bundles from the heating member this member will be carried toward the transfer member 49 but as soon as the bundle has been discharged therefrom it will be immediately returned to its inner position by the spring 99 to leave ample clearance space for the next label.

Describing now the driving mechanisms for the various feeding, wrapping and folding mechanisms, the main drive shaft 30 carries a pinion 150 which meshes with a gear 151, this gear having three cam studs 152 extending from one face thereof and spaced equally apart. This gear is mounted on the front end of shaft 153 whose rear end carries the bevel pinion 154 which meshes with a bevel gear 155 at the lower end of the shaft 156 extending diagonally upwardly and terminating in bevel pinion 157, the shaft being journaled in frame parts 158 and 159 (Fig. 2). The pinion 157 meshes with a bevel gear 160 on the rear end of the shaft 90. A pinion 162 on this shaft meshes with the gear 163 on a stub shaft 164 extending from the side wall 27 and this gear has four studs 165 extending from one of its faces and spaced 90 degrees apart (Figs. 2, 15 and 16). All devices connected with the shafts or gears of the transmission train thus far described are driven continuously. A number of the parts, such as the transfer drums, feed mechanisms, discharge mechanisms, must be driven intermittently. Such intermittent movement is produced by intermittent gear mechanism. The shaft 38 which carries at its front end the gum stick receiving and discharging drum 37 carries at its rear end cam gear 166 with which the studs 152 on gear 151 coöperate, the cam gear having the four radial cam grooves $166'$ for receiving the studs. The flaring outer ends of the cam grooves are rounded in the arcs of circles of which the shaft of the gear 151 is the center, so that when initially entering and finally leaving a cam groove the studs 152 will not effect rotation of the gear 166. The cam gear is thus turned intermittently, there being momentary pauses while the studs pass over the rounded ends of the cam grooves. The cam gear 166 meshes with a pinion 167 on the rear end of shaft 168 carrying at its front end the feed roller 169 which coöperates with the drum 37 to feed wrapping papers for the individual gum sticks (Fig. 1). Another gear 170 on the shaft 168 meshes with an idler pinion 171 pivoted from the gum stick magazine 32 and this pinion meshes with a gear 173 on the rear end of a shaft 174 with whose front end is connected the feed roller 175 which coöperates with the companion roller 176 to feed the oiled paper 41 for wrapping the gum sticks, the rollers being mounted on the gum stick magazine 32, shown in Fig. 1. The cam gear 166 also meshes with an idler pinion 177 secured to the gear 178, this gear meshing with a pinion 179 on the rear end of shaft 180 which carries at its front end the friction feed member $180'$ for feeding wrappers from the magazine 40 (Fig. 1). The various gears connected with the cam gear 166 and the various parts controlled thereby are of course operated intermittently as the gum receiving drum must pause intermittently in order to receive the gum sticks from the gum magazine. The gear 151 which is driven directly from the main drive shaft meshes with the idler 181 which in turn meshes with a pinion 182 on the rear end of a shaft 183 (Fig. 2). Adjacent the pinion the shaft carries a crank arm 184 connected by rod 185 with the crank arm 186 on the rear end of shaft 187. The crank arms are parallel and the shafts are parallel and extend to the front of the machine (Fig. 1) where they carry respectively parallel crank arms 188 and 189, the transfer frame 44 being pivoted on the ends of these crank arms, this transfer frame being given bodily rotary movement to progressively shift the wrapped gum sticks from the drum 37 and to stack the sticks into bundles preparatory to shifting of the bundles through the frame 46 by the fork member 53.

Referring to Figs. 15 and 16, below stub shaft 164 is a stub shaft 190 carrying an idler gear 191 provided on its face with four radially extending cam ways 192 with which the cam rollers 165' on the studs 165 on wheel 163 coöperate, the gear 191 being thus rotated intermittently. The gear engages a pinion 193 on the shaft 102 on the front end of which the transfer drum 49 is mounted. The pinion 193 engages the pinion 194 connected by flexible shaft 195 with the glue applying disks 131. The intermittent gear 191 also drives the gear 196 through idler gear 197, the gear 196 being on shaft 64 to whose front end is secured the transfer member 47 which transfers gum bundles to the sealing mechanism 48. Above the intermittent gear 191 and meshing therewith is a pinion 198 connected by flexible shaft 199 with the shaft 79'' carrying the feed roll 79 (Fig. 3), between which roll and the companion roll 80 the paraffined paper is fed for sealing the gum bundles. A stub shaft 200 extending rearwardly from the side frame 27 mounts outer and inner gears 201 and 202 connected together by a hub 203, the outer gear meshing with the continuously rotating gear 163 and the other gear meshing with the pinion 204 on the rear end of shaft 138 which at its front end carries the friction feed member 129 for feeding labels to the transfer drum 49 (Figs. 1, 13 and 14). The shaft 168 which carries the roller 169 for coöperating with the friction feed member 129 to feed labels to drum 49 carries at its inner end pinion 206 engaged by a gear 207 on the shaft 102 supporting the drum 49. On the shaft 90 which mounts the cam for controlling the knife for cutting the paraffin paper is mounted a cam disk 208 having a cam groove 209 (Figs. 19 and 20). A cam rod 210 has the forked end 211 slidable on the nut 212 on the shaft and carries a cam roller 213 engaging in the groove 209. The lower end of the cam rod pivots to the arm 214 secured to the shaft 76 which carries the discharge arm 75 associated with the bundle transfer member 47. Referring to Fig. 15, the shaft 76 terminates on the rear side of the machine in a crank arm 215 connected by connecting rod 216 with the crank arm 217 on the shaft 114 which carries the discharge arm 113 associated with the transfer drum 49. Upon rotation of shaft 90 these two discharge arms are swung together to discharge the gum bundles from the respective transfer members. The shaft 90 also carries a cam disk 218 having a cam groove 219 in which a cam roller (not shown) on a cam rod 220 engages, whose forked end 221 slides on a nut (not shown) on the shaft in substantially the same manner as the cam lever 210. The upper end of the rod 220 pivots to the end of a crank arm 222 on the rear end of shaft 223, from whose front end and in opposite direction extends the crank arm 224 pivoted to the upper end of the discharge fork member 53 already referred to. The front end of shaft 90 supports a crank arm 225 from whose end a crank pin 226 extends forwardly. Journaled on this crank pin is a horizontal sleeve 227 integral with which is a sleeve 228 at right angles thereto, and through this latter sleeve the discharge member 53 is slidable. The effect of the above controlling mechanism is to cause the lower end of the member 53 to describe a more or less elliptical path to carry the prongs 53' at its lower ends through the open upper end of the frame 46 to carry the gum bundles through this frame and into the transfer member 47 (Fig. 1). As before stated, the various parts connected with the shaft 38 on which the drum 37 is mounted are driven intermittently due to the intervention in the gearing train of the cam gear 166. This cam gear is mounted on the shaft 38 and its gearing relation to the main drive shaft 30 is as 1 to 4, the drum having four drum stick receiving slots and therefore rotatable one-fourth turn for each revolution of the main drive shaft. The various mechanisms for controlling the movements of the individual gum sticks and for controlling the feeds for the wrapping material operate at the same speed as the main drive shaft and once for each quarter turn of the drum 37. The rollers 175 and 176 for controlling the feed of oiled paper to the individual gum sticks are connected by gearing train with the cam gear 166, already described, and operate intermittently. Above these rolls are other rolls 230 and 231 driven directly from the main drive shaft by a chain belt 232, the paper being thus allowed to slack between the upper and lower rolls in order that the lower rolls will not have to operate against the resistance of the reel 42 which feeds wrapping paper. The feed member feeds wrappers for individual gum sticks and the transfer frame shifts the wrapped gum sticks progressively away from the drum 37 and stacks the wrapped sticks into bundles. As the mechanism is designed to stack five sticks in a bundle, the mechanisms which control the bundles must operate at one-fifth the speed of the mechanisms controlling the individual sticks. The shaft 90 with which the bundle controlling mechanisms are connected is therefore driven at one-fifth the speed of the main drive shaft through the gearing train already described and all the bundle controlling mechanisms connected with the shaft 90 through uniformly operating gearing trains will operate accordingly, while those mechanisms controlled from the intermittent gear 191 operate intermittently, such intermittent operating mechanisms being those which must pause a sufficient length of time to allow bundles to be fed thereto or to be discharged therefrom. The fork member 53 driven by shaft 90 by means of cam and crank mechanism will shift the bundles through the frame 46 and into the pockets of the transfer member 47.

Referring to Figs. 15 and 16 the gearing relation is such that for each revolution of the pinion 162 on shaft 90 the gear 163 will rotate one-fourth of the revolution, and the cam gear 191 will likewise rotate one-fourth of a revolution. The gearing relation between the gear 191 and the gear 193 is such that the gear 193 will turn one-half revolution for one-fourth revolution of the cam gear and this gear 193 is on the shaft 102 which supports the rotary transfer member 49. The gear 196 mounted on shaft 64 which supports the transfer member 47 will rotate one-half revolution for each one-fourth revolution of the cam gear to which it is connected by the idler 197. The two transfer members each having two opposite pockets are thus intermittently rotated 180 degrees for each rotation of shaft 90. The cam lever 94 connected with the shafting 95 on which are mounted the glue applying disks 131 meshes with the pinion 193 so that glue is applied to the labels during each half rotation of the transfer member 49. The shafting 199 connected by pinion 198 with the cam gear 191 effects intermittent drive of the feed rolls 79 and 80 for the paraffined bundle wrapping paper, but the knife mechanism for cutting the paper is driven directly from the shaft 90 through the intervention of cam mechanism (see Fig. 18) the discharge arms 75 and 113 are swung simultaneously as before described by means of the cam connection with the shaft 90 already described, these arms effecting discharge of bundles from the transfer members 47 and 49 respectively during the pauses of these members. The glue pot in which the glue applying disks 131 revolve is rocked intermittently by means of the cam mechanism operated on shaft 138 which is driven by the gear 204, this same shaft terminating in a friction feed member 129 for feeding labels to the transfer member 49. It will be noted that the labels $l$ serve also to hold the sealing wrapper ends securely in overlapped position to prevent separation thereof before the wax has a chance to cool and to harden, and to keep the wax confined so as to prevent deposit in the machine. Referring particularly to Figs. 13 and 14, the drum for the transfer member 49 is between the two heating devices 48 and 51 and considerable heat is radiated therefrom to the transfer drum, particularly from the heating mechanism 48. The transfer member might therefore become sufficiently heated to prevent hardening of the wax. However, a label $l$ bing inserted with each sealed gum bundle into the transfer member pocket from the heating mechanism 48 and the label being secured about the bundle before discharge from the transfer member, the sealing wrapper ends will be securely held together until cool and thus prevented from separating. Again, the folded extensions of the sealing wrapper when passing between the heating heads 123 and 123′ are heated in order to flux the wax, and although this heat may reach the longitudinal ends of the wrapper, the label, which extends close to the ends of the bundle, would prevent separation of the ends. The bundles are thus delivered from the machine accurately and fully sealed.

I thus provide a very simple and efficient machine into which the gum sticks and the various wrappers and labels are fed and in which the gum sticks are first individually wrapped with an inner moisture proof wrapper and an outer label wrapper, these sticks being then stacked into bundles, and the bundles then thoroughly sealed by moisture-proof wrappers and a label band applied about the sealed bundles. The machine is automatic in its entire operation, the bare gum sticks entering at one end and completely sealed and wrapped bundles being discharged from the other end, the sealing of a moisture-proof wrapper about each bundle fully protecting the gum against air and moisture and causing the gum to retain its proper consistency and flavor. I do not desire to be limited to the precise construction, arrangement and operation shown and described as changes and modifications might be made which would still come within the scope of the invention and

I claim the following:

1. In a wrapping machine, the combination of a carrier, means for successively charging bundles into said carrier, means for folding a wrapper about three sides of each bundle during charging thereof into said carrier, the wrapper being wider than the bundle, sealing mechanism, means for charging the partially wrapped bundles successively from said carrier into said sealing mechanism to effect folding of the remaining end of the wrappers about the remaining side of the bundles and to overlap the ends of the wrappers, means controlled by said sealing mechanism for sealing together said overlapping ends, a second carrier adapted to receive the bundles from the sealing mechanism, folding mechanism on said second carrier for partially folding the extending sides of the bundles during transit to said second carrier, additional folding mechanism and means for shifting the bundles thereto from said second carrier, said additional folding mechanism effecting complete folding together of the extending sides of the wrapper, and means for sealing said folds together.

2. In a gum wrapping machine, the combination of means for individually wrapping sticks of gum, means for stacking any predetermined number of sticks into bundles, means for winding and folding a wrapper intimately about each bundle, means for sealing together the folds of the wrapper, and means for securing a label about each wrapped bundle.

3. In a wrapping machine of the class described, the combination of a frame for successively receiving bundles of articles, a transfer member having a receiving pocket, means for feeding wrappers one at a time between said frame and receiving pocket, means for discharging a bundle from said frame toward and into said pocket whereby a fed wrapper is wound about three sides of the bundle, a second transfer member having a pocket, means for moving said first transfer member to carry its pocket into register with the pocket of the second transfer member, means for discharging the bundle from said first transfer member to the second transfer member and an intermediate member for wrapping the end of the wrapper about the remaining side of the bundle during such shifting of the bundle between the transfer members, the wrappers being wider than the length of the bundles, means for partially folding the extending sides of the wrapper against the bundle ends during transfer of the bundle to the second transfer member, additional folding mechanism, means for moving said second transfer member into register with said additional folding mechanism, and means for discharging the bundles from said second carrier member to the additional folding mechanism, said additional folding mechanism causing complete folding of the extending sides of the wrapper against the bundle ends.

4. In a wrapping machine of the class described, the combination of a frame for successively receiving bundles of articles, a transfer member having a receiving pocket, means for feeding wrappers one at a time between said frame and receiving pocket, means for discharging a bundle from said frame toward and into said pocket whereby a fed wrapper is wound about three sides of the bundle, a second transfer member having a pocket, means for moving said first transfer member to carry its pocket into register with the pocket of the second transfer member, means for discharging the bundle from said first transfer member to the second transfer member and an intermediate member for wrapping the end of the wrapper about the remaining side of the bundle during such shifting of the bundle between the transfer members, the wrappers being wider than the length of the bundles, means for partially folding the extending sides of the wrapper against the bundle ends during transfer of the bundle to the second transfer member, additional folding mechanism, means for moving said second transfer member into register with said additional folding mechanism, means for discharging the bundles from said second carrier member to the additional folding mechanism, said additional folding mechanism causing complete folding of the extending sides of the wrapper against the bundle ends, and means for sealing the folds together.

5. In a wrapping machine of the class described, the combination of a frame for receiving a bundle of articles, a carrier having a receiving pocket, means for feeding wrappers of greater width than the length of the bundles, means for shifting the bundle from said frame into said pocket, means for causing the wrapper to be partly wound about a bundle during such shifting, a second carrier member having a pocket, means for shifting a bundle from said first carrier toward said second carrier and into the pocket of the second carrier, a sealing frame having a passageway through which said bundle passes on its way to the second carrier, said passageway completing the winding of the wrapper about the bundle, means for partially folding the extending sides of the wrapper against the bundle ends during passage of the bundle into said second carrier, means for discharging the bundle from the second carrier, and additional folding means for receiving the bundle from the second carrier and for completing the folding of the extending sides of the wrapper.

6. In a wrapping machine of the class described, the combination of a frame for receiving bundles of articles, a carrier and means for shifting the bundle from the frame thereto, means for feeding a wrapper between said frame and carrier to be wrapped partially about a bundle during such shifting thereof, a folding frame, means for shifting the bundle from said carrier to the folding frame, the wrapper being completely wound about the bundle during such shifting to the folding frame, a second carrier for receiving bundles from the folding frame, and folding mechanism associated with said second carrier for folding the extending sides of said wrapper against the bundle ends.

7. In a wrapping machine of the class described, the combination of a frame for receiving bundles of articles, a carrier and means for shifting the bundle from the frame thereto, means for feeding a wrapper between said frame and carrier to be wrapped partially about a bundle during such shifting thereof, a folding frame, means for shifting the bundle from said carrier to the folding frame, the wrapper being completely wound about the bundle during such shifting to the folding frame, a second carrier for receiving bundles from the folding frame, folding mechanism associated with said second carrier for folding the extending sides of said wrapper against the bundle ends, and additional folding means for receiving the bundle from said second carrier and for completing the folding against the ends of the extending sides of the wrapper.

8. In a wrapping machine of the class described, the combination of a rotatable carrier having pockets for receiving bundles of gum sticks, means for feeding bundles successively into said pockets, means for partially winding a wrapper about each bundle during charge thereof into said carrier, a folding frame having a receiving pocket, means for rotating the carrier to bring a charged-in bundle into register with said folding frame pocket and means for discharging the bundle from the carrier into the folding frame pocket, said wrapper being completely wrapped about the bundle during transfer thereof to the folding frame, each wrapper having sealing material applied along its ends, and heating mechanism on said folding frame for heating said sealing material during folding of the wrapper to thereby effect securing together of the wrapper ends.

9. In a wrapping machine of the class described, a folding frame, means for applying wrappers about the articles, said wrappers having sealing material applied to their ends, and heating means for heating said frame whereby said sealing material is softened during folding of the wrapper to cause the wrapper ends to be secured together.

10. In a wrapping machine of the class described, the combination of a rotatable carrier having pockets in its opposite sides, means for charging bundles of articles successively into said pockets, means for feeding a wrapper in advance of said carrier to be partially wrapped about a bundle during charging thereof into a pocket, a folding frame having a passageway for bundles, means for rotating said carrier to bring the charged pockets into register with said passageway, means for transferring the bundle from the carrier pocket into the passageway, the wrapper being completely wound about the bundle during such transfer, a second rotary carrier having pockets in its opposite sides for receiving bundles, means for shifting a bundle from said folding frame into a pocket of the second carrier, said wrappers being wider than the length of the bundle whereby the wrapper sides extend beyond the bundle ends after winding thereof about the bundle, folding mechanism associated with the pockets of the second carrier to partially fold said sides against the bundle ends, additional folding mechanism, means for rotating said second carrier to carry a bundle therein toward said additional folding mechanism, and means for discharging the bundle from said second carrier to said additional folding mechanism, said additional folding mechanism completing the folding of the extending sides of the wrapper against the bundle ends.

11. In a wrapping machine of the class described, the combination of a rotary carrier having a rectangular pocket, means for feeding a wrapper in front of said pocket, means for charging a stack of gum sticks against said wrapper and into said pocket to cause one end of said wrapper to be wound about the sides of the stack within said pocket, a folding member having a rectangular passageway, means for rotating said carrier to bring its pocket into register with said passageway whereby the free end of the wrapper is trailed against the folding frame and held against the outer face of the bundle, means for shifting the bundle from the carrier pocket into said passageway whereby the inner end of the wrapper is folded over the bundle and against the other end of the wrapper by the engagement of said outer end with the entrance edge of said passageway, and means for tilting said folding member away from the carrier to provide clearance space for the feeding of wrappers.

12. In a wrapping machine of the class described, the combination of a rotary carrier having a rectangular pocket, means for feeding a wrapper in front of said pocket, means for charging a stack of gum sticks against said wrapper and into said pocket to cause one end of said wrapper to be wound about the sides of the stack within said pocket, a folding member having a rectangular passageway, means for rotating said carrier to bring its pocket into register with said passageway whereby the free end of the wrapper is trailed against the folding frame and held against the outer face of the bundle, means for shifting the bundle from the carrier pocket into said passageway whereby the inner end of the wrapper is folded over the bundle and against the other end of the wrapper by the engagement of said outer end with the entrance edge of said passageway, sealing material at the wrapper ends, and means for heating the folding frame whereby said sealing material is softened during the folding operation and the wrapper ends secured together.

13. In a wrapping machine of the class described, the combination of a rotary carrier having a rectangular pocket, means for feeding a wrapper in front of said pocket, means for charging a stack of gum sticks against said wrapper and into said pocket to cause one end of said wrapper to be wound about the sides of the stack within said pocket, a folding member having a rectangular passageway, means for rotating said carrier to bring its pocket into register with said passageway whereby the free end of the wrapper is trailed against the folding frame and held against the outer face of the bundle, means for shifting the bundle from the carrier pocket into said passageway whereby the inner end of the wrapper is folded over the bundle and against the other end of the wrapper by the engagement of said outer end with the entrance edge of said passageway, the wrapper ends having sealing material applied thereto, means for heating the folding entrance edge of the folding frame, and means for tilting said folding frame away from the carrier to provide clearance space for the feeding of wrappers.

14. In a wrapping machine of the class described, the combination of means for winding about a bundle of articles a wrapper containing adhesive material and of greater width than the length of the bundle whereby the sides of the wrapper extend beyond the bundle ends, means for heating the adhesive material at the wrapper ends while these ends are being brought into overlapping engagement at the conclusion of the winding operation whereby said ends are secured together, a carrier having a pocket, means for transferring the bundle from the wrapping mechanism to said pocket, means associated with said carrier for partly folding the extending sides of the wrapper against the bundle ends when the bundle is received in the pocket, means for discharging the bundle from said carrier, and additional folding mechanism for receiving the bundle from the carrier and for completing the folding of the wrapper sides against the bundle ends.

15. In a wrapping machine of the class described, the combination of means for winding about a bundle of articles a wrapper containing adhesive material and of greater width than the length of the bundle whereby the sides of the wrapper extend beyond the bundle ends, means for heating the adhesive material at the wrapper ends while these ends are being brought into overlapping engagement at the conclusion of the winding operation whereby said ends are secured together, a carrier having a pocket, means for transferring the bundle from the wrapping mechanism to said pocket, folding extensions on said carrier engaging with the wrapper sides during charging of the bundle into said pocket to effect partial folding of the sides against the bundle ends, additional folding mechanism, means for moving said carrier to bring its pocket into alinement with said additional folding mechanism, and means for discharging a bundle from said carrier to the additional folding mechanism, said additional folding mechanism effecting complete folding of the wrapper against the bundle ends.

16. In a wrapping machine of the class described, the combination of means for winding about a bundle of articles a wrapper containing adhesive material and of greater width than the length of the bundle whereby the sides of the wrapper extend beyond the bundle ends, means for heating the adhesive material at the wrapper ends while these ends are being brought into overlapping engagement at the conclusion of the winding operation whereby said ends are secured together, a carrier having a pocket, means for transferring the bundle from the wrapping mechanism to said pocket, folding tongues on said carrier adjacent the ends of the pocket for engaging with the extending sides of the wrapper during charge of the bundle into said pocket to partially fold such sides against the bundle ends, additional folding mechanism, means for moving said carrier to bring its pocket into alinement with said additional folding mechanism, and means for shifting the bundle from said carrier to said additional folding mechanism, said additional folding mechanism completing the folding of the wrapper sides against the bundle ends.

17. In a wrapping machine of the class described, the combination of means for winding and securing about a bundle of gum sticks a wrapper containing adhesive material and of greater width than the length of the bundle, a carrier having a pocket, means for heating the adhesive material at the wrapper ends while these ends are being brought into overlapping engagement at the conclusion of the winding operation whereby said ends are secured together, means for shifting the bundle from the wrapper winding and securing mechanism to said pocket, folding mechanism associated with said pocket for engaging with the sides of the wrapper to partially fold said sides against the bundle ends, a frame having a passageway, means for moving said carrier to bring its pocket into line with said passageway, means for discharging the bundle from said carrier and shifting it through said passageway, folding mechanism in said passageway for completing the folding of the wrapper sides against the bundle ends, the sides of the wrapper having sealing material applied thereto, and heating mechanism projecting into said passageway for engaging with the folded sides to soften the sealing material and to thereby effect sealing together of the folded sides.

18. In a wrapping machine of the class described, the combination of means for winding about a bundle a wrapper impregnated with sealing material and of greater width than the length of the bundle, means for softening the sealing material along the overlapping ends of the wrapper while such ends are being brought into overlapping engagement at the conclusion of the winding operation whereby such ends become sealed together, means for folding the extending sides of the wrapper against the bundle ends, and means for softening the sealing material on said folded sides whereby said sides are stuck together.

19. In a wrapping machine, the combination of means for stacking a plurality of articles into a bundle, means for applying a wrapper about said bundle, means for rendering the overlapping ends of the wrapper adhesive, and means for applying a band about the wrapper to prevent separation of the adhesive ends and to prevent deposit of the adhesive material on the machine.

20. In a wrapping machine, the combination of means for stacking a plurality of articles into a bundle, means for applying a wrapper of waxed paper about said bundle, means for heating the overlapping ends of said wrapper to effect softening and fusion of the wax in the ends, and means for winding and securing a band about said bundle to hold the wrapper ends together to prevent separation thereof before cooling and hardening of the heated wax, and to prevent deposit of the adhesive material on the machine.

21. In a wrapping machine, the combination of means for winding a wax-saturated wrapper about an article, heating mechanism for engaging the overlapping ends of the wrapper to effect heating and fusion of the wax in said ends, said wrapper being of greater width than the length of the article, folding means for folding against the ends of the article the extending sides of the wrapper, heating mechanism for heating the folded sides to effect fusion of the wax therein, and means operable during passage of the article from one heating mechanism to the other to wind a band about the article over the wrapper thereon, said band being of substantially the same width as the length of the article and serving to hold the overlapping ends of the wrapper together to prevent separation thereof before the wax has cooled and hardened and to prevent deposit of the adhesive material on the machine.

22. In a wrapping machine, the combination of means for partially folding a wrapper about a bundle, a folding frame for receiving the bundle and completing the folding of the wrapper, a second frame adjacent said folding frame having a pocket, means for feeding an outer wrapper between said frames, said folding frame being normally yieldingly held away from said second frame to provide clearance space for the fed outer wrapper, and means for shifting the wrapped bundle from the folding frame into the second frame to receive the outer wrapper, said folding frame moving toward said second frame during passage of the bundle to the second frame.

23. In a wrapping machine, the combination of a frame having a passageway for receiving a bundle, a folding frame adjacent said bundle receiving frame having a pocket, means for feeding a wrapper between said pocket and said passageway, means for shifting the bundle from said receiving frame into said pocket to thereby effect winding of the wrapper about the bundle, said bundle receiving frame being normally held away from said folding frame to provide clearance space for feeding the wrapper and said frame being allowed to move toward the folding frame during passage of the bundle therefrom to the folding frame pocket.

24. In a bundle wrapping machine, the combination of a frame having a passageway for receiving a bundle, a folding frame having a pocket adapted to register with said passageway, an end plate shiftable longitudinally in said pocket and having projections at the ends of its outer face spaced apart a distance slightly greater than the length of the bundle, means for feeding between said passageway and pocket a wrapper which is of greater width than the length of the bundle, means for shifting the bundle from the passageway against said wrapper and into the pocket whereby said wrapper is folded about the bundle, said projections on said plate engaging the adjacent sides of the wrapper to partially fold said sides inwardly toward the bundle ends, and folding tongues adjacent the pocket in said folding frame for completing the folding of said extending sides against the bundle ends.

25. In a wrapping machine, a carrier having oppositely extending pockets and a passageway connecting said pockets, a sleeve shiftable through said passageway and having an end plate extending across one pocket, a stem in said sleeve having an end plate across the other pocket, and a spring yieldingly holding said stem in said sleeve.

In witness whereof, I hereunto subscribe my name, this 11th day of August, A. D., 1913.

ALBERT M. PRICE.

Witnesses:
SADIE M. RYAN,
CHARLES J. SCHMIDT.